US012614938B2

(12) United States Patent
Bangerter

(10) Patent No.: US 12,614,938 B2
(45) Date of Patent: Apr. 28, 2026

(54) SHAFTLESS ROTOR ASSEMBLY

(71) Applicant: Ford Global Technologies, LLC, Dearborn, MI (US)

(72) Inventor: Adam Bangerter, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 18/315,997

(22) Filed: May 11, 2023

(65) Prior Publication Data

US 2024/0380261 A1 Nov. 14, 2024

(51) Int. Cl.
H02K 1/28 (2006.01)
H02K 5/15 (2006.01)

(52) U.S. Cl.
CPC ................. H02K 1/28 (2013.01); H02K 5/15 (2013.01)

(58) Field of Classification Search
CPC ... H02K 1/28; H02K 5/15; H02K 1/22; B60K 6/26
See application file for complete search history.

(56) References Cited

U.S. PATENT DOCUMENTS

| | | | |
|---|---|---|---|
| 9,689,658 B2 | 6/2017 | Moravec et al. | |
| 11,223,262 B1 * | 1/2022 | Bender | H02K 15/03 |
| 2013/0093279 A1 * | 4/2013 | Yokota | H02K 1/2766 |
| | | | 310/216.115 |
| 2019/0393747 A1 * | 12/2019 | Tang | H02K 5/20 |
| 2020/0112216 A1 * | 4/2020 | Galmiche | H02K 7/003 |
| 2021/0140402 A1 | 5/2021 | Sninsky | |
| 2021/0288564 A1 | 9/2021 | Lahrman et al. | |

FOREIGN PATENT DOCUMENTS

| | | | |
|---|---|---|---|
| CN | 101635482 B | 12/2011 | |
| CN | 103192049 A | 7/2013 | |
| CN | 205566055 U | 9/2016 | |
| CN | 206442258 U | 8/2017 | |
| DE | 102021122998 A1 * | 3/2023 | H02K 1/2766 |

* cited by examiner

*Primary Examiner* — Thomas Truong
(74) *Attorney, Agent, or Firm* — McCoy Russell LLP

(57) ABSTRACT

A shaftless rotor assembly comprising first end cap, a second end cap, and a plurality of lamination stacks positioned between the first end cap and the second end cap. The shaftless rotor assembly further comprises a plurality of fasteners extending in an axial direction through the first end cap, through the plurality of lamination stacks, and through at least a portion of the second end cap, where the plurality of lamination stacks defines a hollow rotor core.

18 Claims, 5 Drawing Sheets

SHAFTLESS ROTOR ASSEMBLY

TECHNICAL FIELD

The present description relates generally to a shaftless rotor assembly. In one or more examples, the shaftless rotor assembly may be used in a vehicle.

BACKGROUND/SUMMARY

A vehicle such as a hybrid vehicle or a fully electric vehicle (EV) may use a rotor assembly comprising a shaft to drive a vehicle in a direction. In previous rotor assemblies, the shaft may extend through a center of a rotor core comprising lamination stacks and be secured to the rotor core via a fastening system comprising components, such as locknuts and washers. A shoulder may be formed at a first end of the shaft, and the lamination stacks may be held together between the shoulder at the first end of the shaft and fastening components coupled to a second end of the shaft, with the shaft extending axially through the lamination stacks of the rotor core.

However, the inventors herein have recognized potential issues with such traditional rotor assemblies. For example, the shaft extending through the rotor core adds significant weight to the rotor assembly, and even more weight may be added to the rotor assembly due to corresponding fastening components and the shoulder of the shaft configured to hold the rotor assembly together. Such weight may decrease an operational efficiency of a vehicle and place increased strain on the rotor assembly. Particularly with the spinning of the rotor core and shaft, the weight from the shaft running through the rotor core may lead to degradation of the rotor assembly components. Moreover, traditional fastening systems, such as a locknut and washer system, results in rotor assemblies that are relatively complex and time-consuming to manufacture.

In one example, the issues described above may be addressed by a shaftless rotor assembly comprising a plurality of lamination stacks having at least one keyway cutout for alignment with a pair of end caps, and a plurality of fasteners threaded through the pair of end caps and the plurality of lamination stacks in a direction parallel to an axis of rotation. In this way, the rotor shaft is eliminated from a rotor core of the rotor assembly, thus significantly reducing a weight of the rotor assembly compared to previous approaches. Further, traditional fastening systems, such as the locknut and washer system, may also be eliminated from the rotor core assembly according to the present disclosure, thus simplifying manufacturing. That is, via the shaftless rotor assembly according to the present disclosure, which comprises fasteners extending axially through lamination stacks and end caps according to the present disclosure and that does not have a shaft extending therethrough, a reduced weight rotor assembly with simplified manufacturing results.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
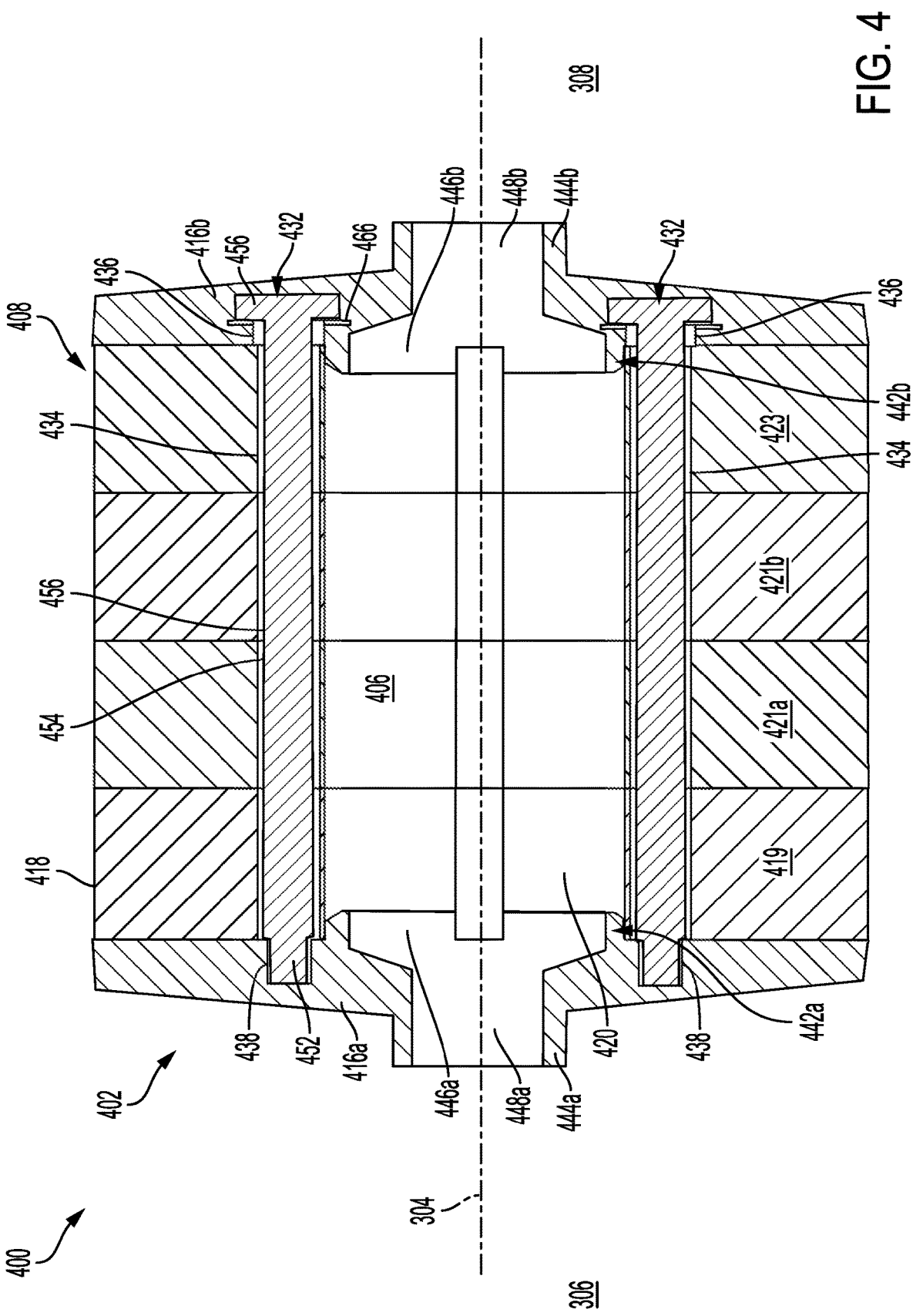
FIG. 4 shows a cross-sectional view of a schematic for the rotor core assembly according to the present disclosure.
Figure 5:
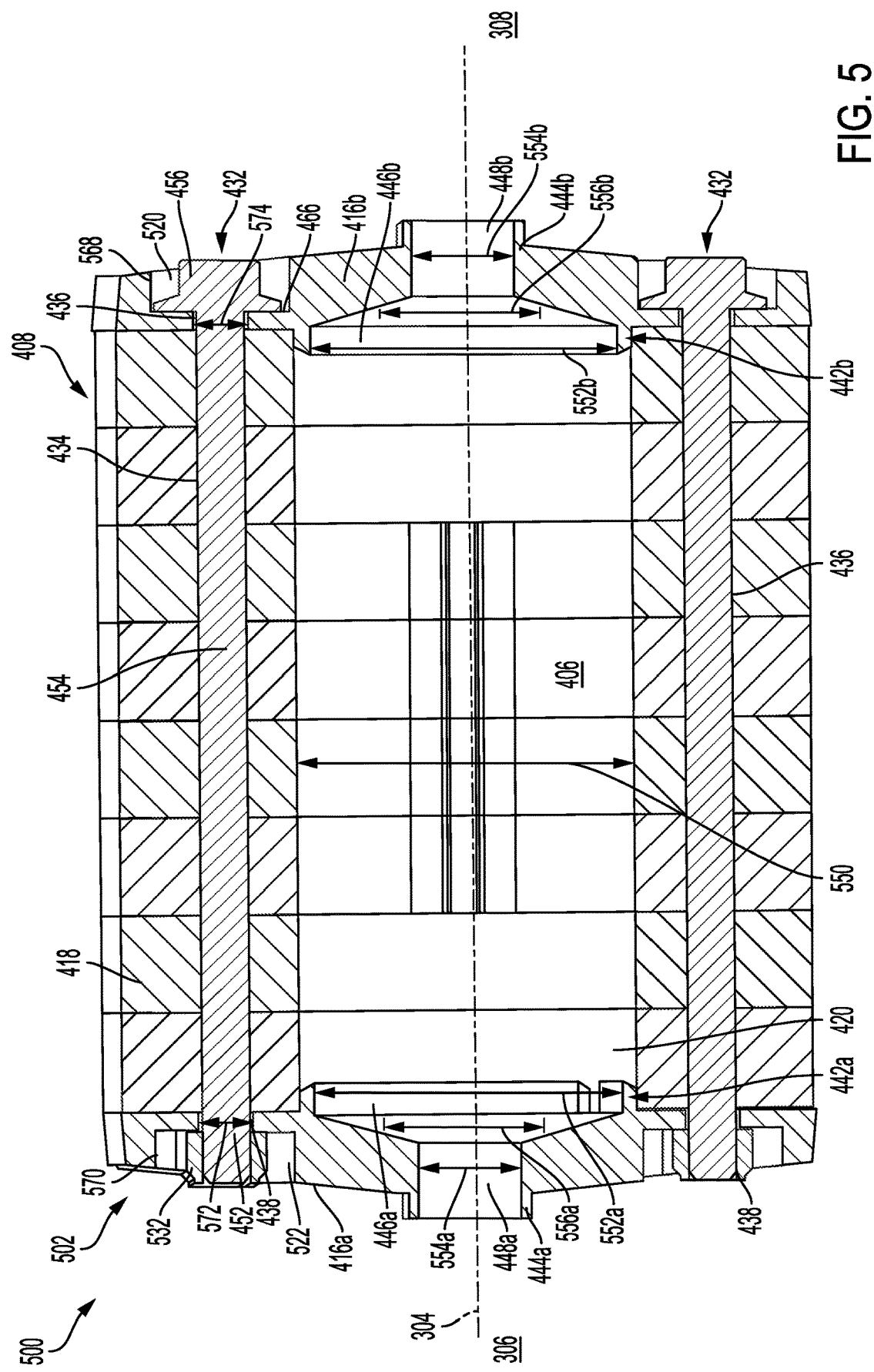
FIG. 5 shows a cross-sectional view of the rotor core assembly according to the present disclosure.

The following description relates to a shaftless rotor assembly. In one or more examples, the shaftless rotor of the present disclosure may be incorporated into a vehicle, such as the vehicle shown at FIG. 2. For example, the shaftless rotor may be incorporated into an electric machine of the vehicle, where the electric machine is part of the vehicle powertrain. There are various possible vehicle powertrain configurations into which the shaftless rotor of the present disclosure may be incorporated, such as those shown at FIG. 1. Whereas rotor assemblies according to the prior art comprise a shaft extending therethrough as shown at the FIG. 3 prior art example, the rotor assembly according to the present disclosure does not have a shaft extending therethrough. Rather, the rotor assembly according to the present disclosure may comprise a hollow rotor core that extends between two end caps, where the two end caps may be drivingly coupled to an output without a shafting extending through the rotor assembly, as shown at FIG. 4 and FIG. 5. As may further be seen at FIG. 4 and FIG. 5, the rotor assembly according to the present disclosure may comprise lamination stacks that define the hollow rotor core, and fasteners may extend through the end caps and the lamination stacks in a direction parallel to a rotational axis of the rotor assembly. In this way, the rotor assembly according to the present disclosure achieves the technical advantage of significantly reduced weight compared to traditional rotor assemblies. Further, due to manner in which the rotor assembly is coupled, manufacturing may be simplified.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced. FIGS. 1-4 show schematics of example configurations with relative positioning of the various components. FIG. 5 is shown approximately to scale, although other relative dimensions may be used. As used herein, the terms "approximately" is construed to mean plus or minus five percent of the range unless otherwise specified.

Further, FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis unless otherwise specified. Features described as counter-axial may be approximately perpendicular to an axis unless otherwise specified. Features described as radial may circumferentially surround or extend outward from an axis unless otherwise specified.

Features described as longitudinal may be approximately parallel with an axis that is longitudinal. An axis that is normal to an axis that is longitudinal may be referred to as lateral. Features described as lateral may be approximately parallel with an axis that is lateral or normal to an axis that is longitudinal.

Figure 1:
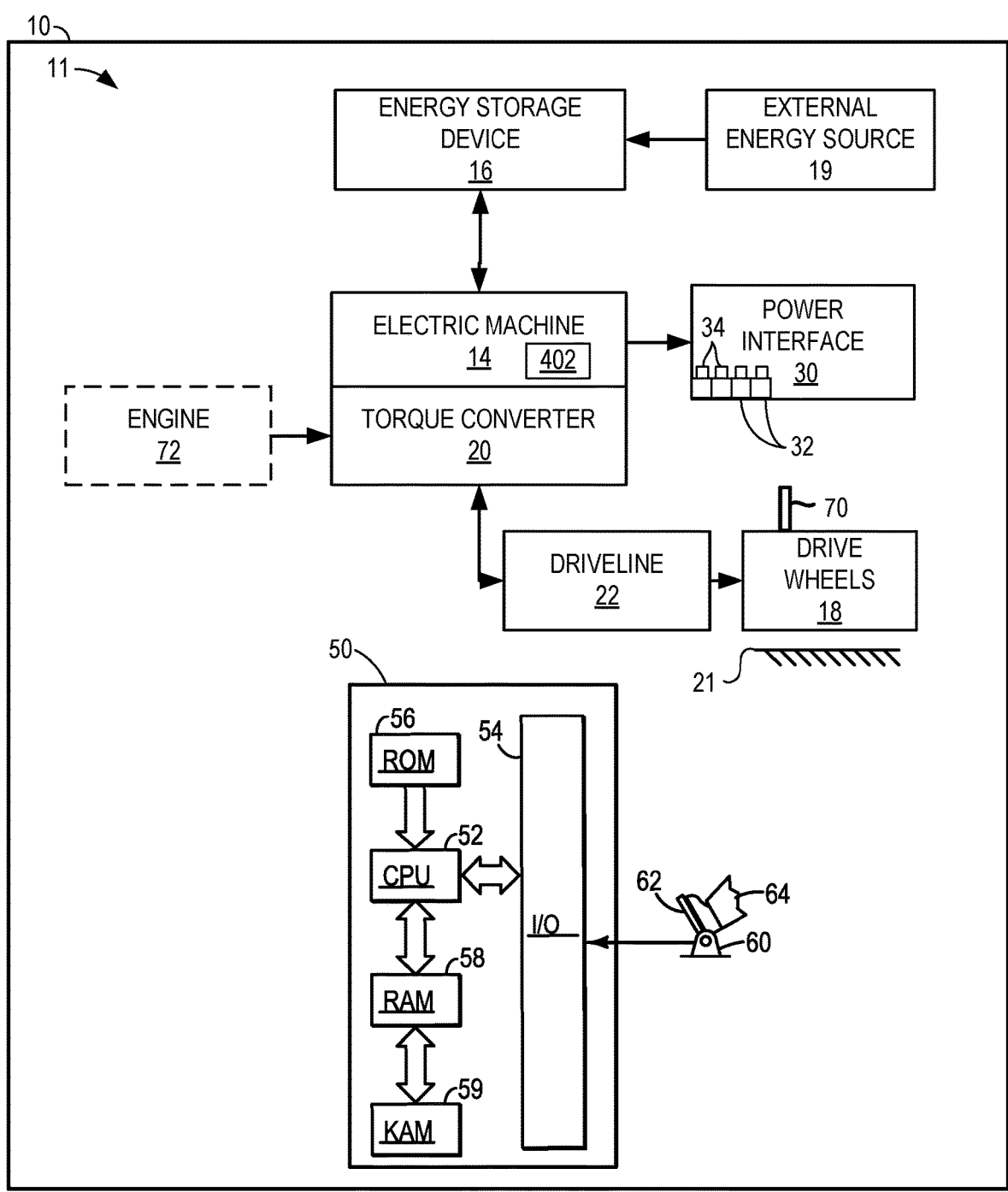
FIG. 1 shows an example vehicle powertrain that may comprise a rotor assembly according to the present disclosure.

Turning now to FIG. 1, FIG. 1 schematically depicts an example of a vehicle 10 with a propulsion system 11 (e.g., electric propulsion system). Propulsion system 11 includes an electric machine 14 (e.g., energy conversion device). The electric machine 14 may be incorporated into an axle of the vehicle 10 and may comprise a shaftless rotor assembly 402 according to the present disclosure. The electric machine 14 is controlled via controller 50. In some examples, the vehicle propulsion system 11 may further include an engine 72, where the engine 72 may be an internal combustion engine.

The electric machine 14 is further shown coupled to an energy storage device 16, which may include a battery, a capacitor, inductor, or other electric energy storage device. The electric machine 14 can be operated to convert mechanical energy received from the vehicle driveline into an energy form suitable for storage by the energy storage device (e.g., provide a generator operation). The electric machine 14 can also be operated to supply an output (power, work, torque, speed, etc.,) to drive wheels 18 (e.g., provide a motor operation). It should be appreciated that the electric machine 14 may, in some embodiments, function only as a motor, only as a generator, or both a motor and generator, among various other components used for providing the appropriate conversion of energy between the energy storage device and the vehicle drive wheels. For instance, the electric machine 14 may include a motor, a generator, integrated starter generator, starter alternator, among others and combinations thereof. The electric machine 14 may also include or be coupled to an inverter. The inverter may be configured to condition electrical energy in and out of the energy storage device (e.g., high voltage battery). However, in other examples, the vehicle may not include an inverter.

The energy storage device 16 may be selectively coupled to an external energy source 19. For example, the energy storage device 16 device may be periodically coupled to a charging station (e.g., commercial or residential charging station), portable energy storage device, etc., to allow the energy storage device 16 to be recharged.

The electric machine 14 is coupled to a torque converter 20. The torque converter 20 is a fluid coupling designed to transfer rotational input from the electric machine 14 to a driveline 22. The driveline 22 includes a transmission with gearing and other suitable mechanical components designed to transfer rotational motion to the drive wheels 18. The drive wheels 18 may be supported by and drive vehicle 10 across a surface 21. The mechanical components may include a gearbox, axles, transfer cases, etc., for example. The torque converter 20 and the electric machine 14 are depicted as an interconnected unit. However, in other examples, the torque converter 20 and the electric machine 14 may include discrete enclosures.

The electric machine 14 may include one or more clutches designed to selectively rotationally couple the machine's rotor to torque converter 20. For instance, the clutch or clutches may each include plates, splines, and/or other suitable mechanical components allowing the machine to be rotationally connected as well as disconnected from the engine or the torque converter.

The depicted connections between electric machine 14, driveline 22, and drive wheel 18 indicate transmission of mechanical energy from one component to another, whereas the connections between the electric machine 14 and the energy storage device 16 may indicate transmission of a variety of energy forms such as electrical, mechanical, etc. For example, torque may be transmitted from the electric machine 14 to drive the vehicle drive wheels 18 via the driveline 22. As described above, the electric machine 14 may be configured to operate in a generator mode and/or a motor mode. In a generator mode, propulsion system 11 receives some or all of the output from electric machine 14, which reduces the amount of drive output delivered to the drive wheel 18, or the amount of braking torque to the drive wheel 18. Such operation may be employed, for example, to achieve energy efficiency gains through regenerative braking, increased engine efficiency (if included), etc. Further, the output received by the electric machine 14 may be used to charge an energy storage device 16. In motor mode, the electric machine 14 may supply mechanical output to the driveline 22, for example by using electrical energy stored in an electric battery. Additionally, an engine may supply rotational output to the driveline 22, in some instances.

The electric machine 14 may also be used to deliver electrical energy to external, auxiliary devices during power take-off. The electric machine 14 may run during power take-off but the drive wheels 18 are not in motion, allowing power output from the electric machine 14 to be directed at least partially towards operating the auxiliary devices. The vehicle 10 may include a power interface 30 arranged along an electrical circuit of the vehicle 10. The power interface may have a plurality of power outlets 32, each outlet electrically coupled to the electric machine, and plugging the auxiliary devices into the plurality of outlets allows power to be supplied to the auxiliary devices. Each of the power outlets 32 are coupled to or have a circuit breaker 34 integrated therein. The arrow extending between the electric machine 14 and the power interface 30 indicates the transfer of electrical energy therebetween. Further details of the power interface are described below, with reference to FIG. 2.

FIG. 1 also shows a controller 50 in the vehicle 10. The controller 50 receives signals from the various sensors of FIG. 1 and employs the various actuators of FIG. 1 to adjust vehicle operation based on the received signals and instructions stored in non-transitory memory of the controller 50. The electric machine, shown in FIG. 2 as a motor generator, may also be controlled by the controller 50. Specifically, controller 50 is shown in FIG. 1 as a conventional microcomputer including: microprocessor unit 52, input/output ports 54, read-only memory 56, random access memory 58, keep alive memory 59, and a conventional data bus. Controller 50 is configured to receive various signals from sensors coupled to the propulsion system 11 and send command signals to actuators in components in the vehicle, such as the electric machine 14. Additionally, the controller 50 is also configured to receive pedal position (PP) from a pedal position sensor 60 coupled to a pedal 62 actuated by a user 64. Therefore, in one example, the controller 50 may receive a pedal position signal and adjust actuators in the electric machine 14 based the pedal position signal to vary the rotational output of the electric machine 14. The sensors communicating with the controller 50 may include an electric machine sensor (e.g., resolver or Hall effect sensor for sensing a rotor position of the electric machine), and wheel speed sensor 70, accelerometer, etc. Additionally, the controller 50 may communicate electronically with one or more mobile applications. For example, a mobile application may enable the user to select stored auxiliary devices to be charged during a planned trip and based upon an electrical load profile stored in memory for the stored auxiliary devices, the mobile application may determine an amount of energy that will be spent during a planned trip. In one example, the controller 50 may include computer readable instructions, that when executed cause the controller 50 to measure an electrical load of one or more auxiliary devices plugged into the power interface and transmit a measurement of the electrical load to the mobile application. In another example, the controller 50 may include instructions that when executed cause the controller 50 to communicate one or more vehicle operating conditions to the mobile application and adjust one or more vehicle operating conditions in response to a command from the mobile application. An example of a mobile application is described in more detail with reference to FIG. 2.

In examples where the vehicle 10 comprises engine 72, engine 72 may have an output coupled to the torque converter 20 and may be incorporated into the axle of the vehicle. The engine 72 may be controlled via controller 50. Both the engine 72 and electric machine 14 may act as movers to drive the vehicle 10. For example, the vehicle 10 may be a hybrid vehicle. In examples including engine 72, rotational energy in the form torque from the engine 72 or other rotational and mechanical energy from components may be converted into electrical energy by the electric machine 14. The output of the electric machine 14 to the torque converter 20 may act as input for the transfer and transformation of torque into electrical energy during hybrid operations.

Figure 2:
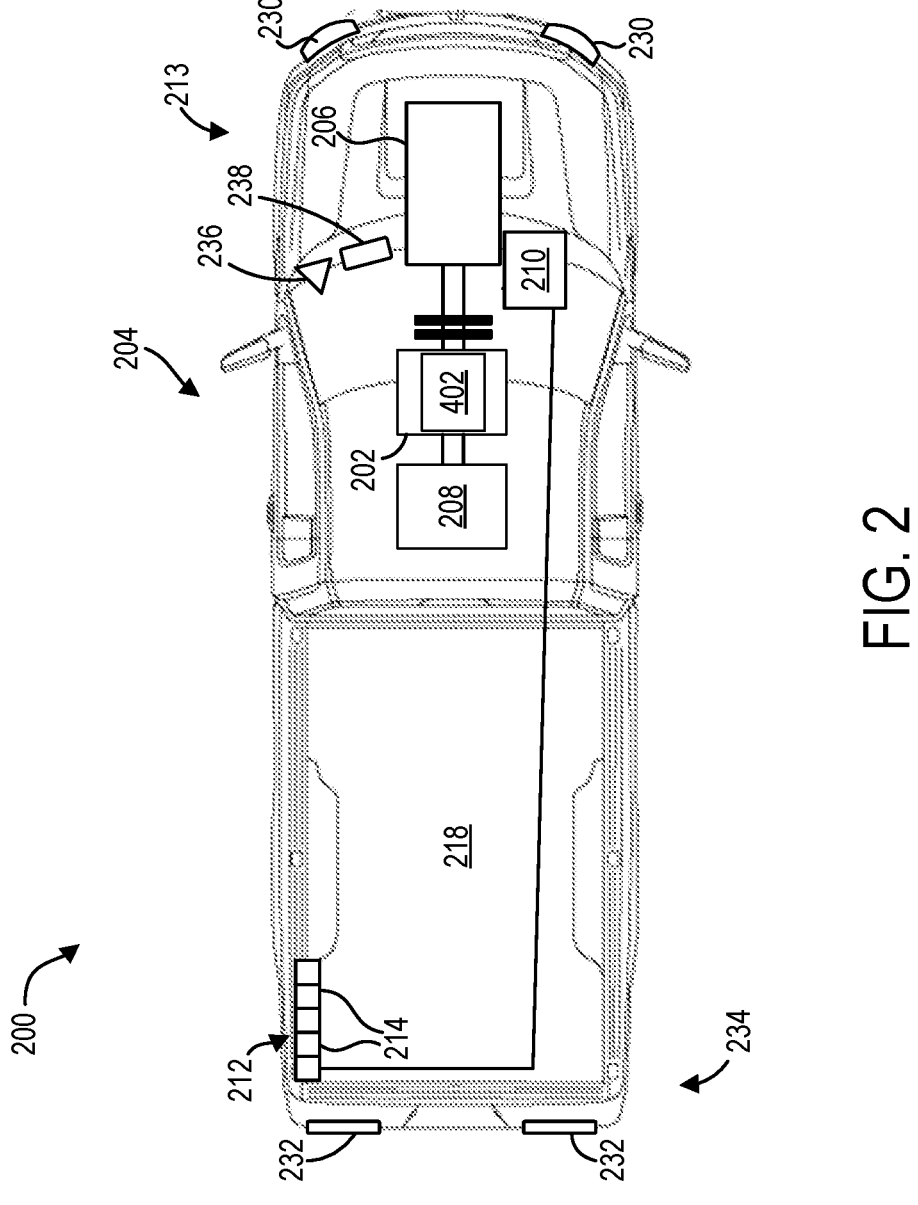
FIG. 2 shows a schematic diagram of an example of a vehicle comprising the rotor assembly according to the present disclosure.

Turning now to FIG. 2, FIG. 2 shows a schematic diagram 200 of an example vehicle 204. As described above, the electric machine 14 of FIG. 1 may be an electric motor incorporated into an axle in some examples. In one or more examples, the electric motor 202 shown in FIG. 2 may be the same or similar to the electric machine 14 shown in FIG. 1. Similarly to the vehicle powertrain shown at FIG. 1, the vehicle 204 shown in FIG. 2 comprises the shaftless rotor assembly 402 according to the present disclosure incorporated therein. That is, the shaftless rotor assembly 402 is shown incorporated into the electric motor 202 of the vehicle 204 at FIG. 2. Additionally, the vehicle 204 shown in FIG. 2 may be the same or similar to the vehicle 10 shown in FIG. 1. As shown in FIG. 2, the electric motor 202 may couple to an electric energy storage device 206 and a transmission 208 in a front end 213 of the vehicle 204. The transmission 208 may incorporate a torque converter, in one or more examples, such as the torque converter 20 shown in FIG. 1.

The vehicle 204 may also have a power interface 212 which may be disposed in a vehicle bed 218, as shown in FIG. 2. However, in other examples, the power interface 212 may be positioned in some other, accessible region of the vehicle 204. The power interface 212 has a plurality of power outlets 214 configured to receive electrical plugs of electrical devices, in one or more examples.

A powertrain control module (PCM) 210 may be included, for example, in the controller 50 of FIG. 1. The PCM 210 receives information from sensors arranged in a powertrain of the vehicle 204 and sends instructions to actuators of the powertrain. For example, the PCM 210 may receive a signal from a resolver of the electric motor 202 to infer a power output of the electric motor 202 and command adjustment of the output of the electric motor 202, e.g., field current, according to active motor operations and electrical loads. The PCM 210 may also control activation of vehicle accessories such as headlights 230, taillights 232, positioned at the front end 213 and a rear end 234 of the vehicle 204, respectively, a speaker or horn 236, and a cabin display panel 238. As such, illumination of the headlights 230 and taillights 232 may be enabled by the PCM 210 as well as emission of noises by the horn 236 and presentation of alerts and notifications at the cabin display panel 238.

The PCM 210 may also communicate with the power interface 212 and/or an auxiliary device through a communication link. The communication link may be a wireless communication network, such as a Bluetooth low energy (BLE) network, allowing the PCM 210 to monitor electrical and operating statuses of power interface 212 and any coupled the auxiliary devices.

Figure 3:
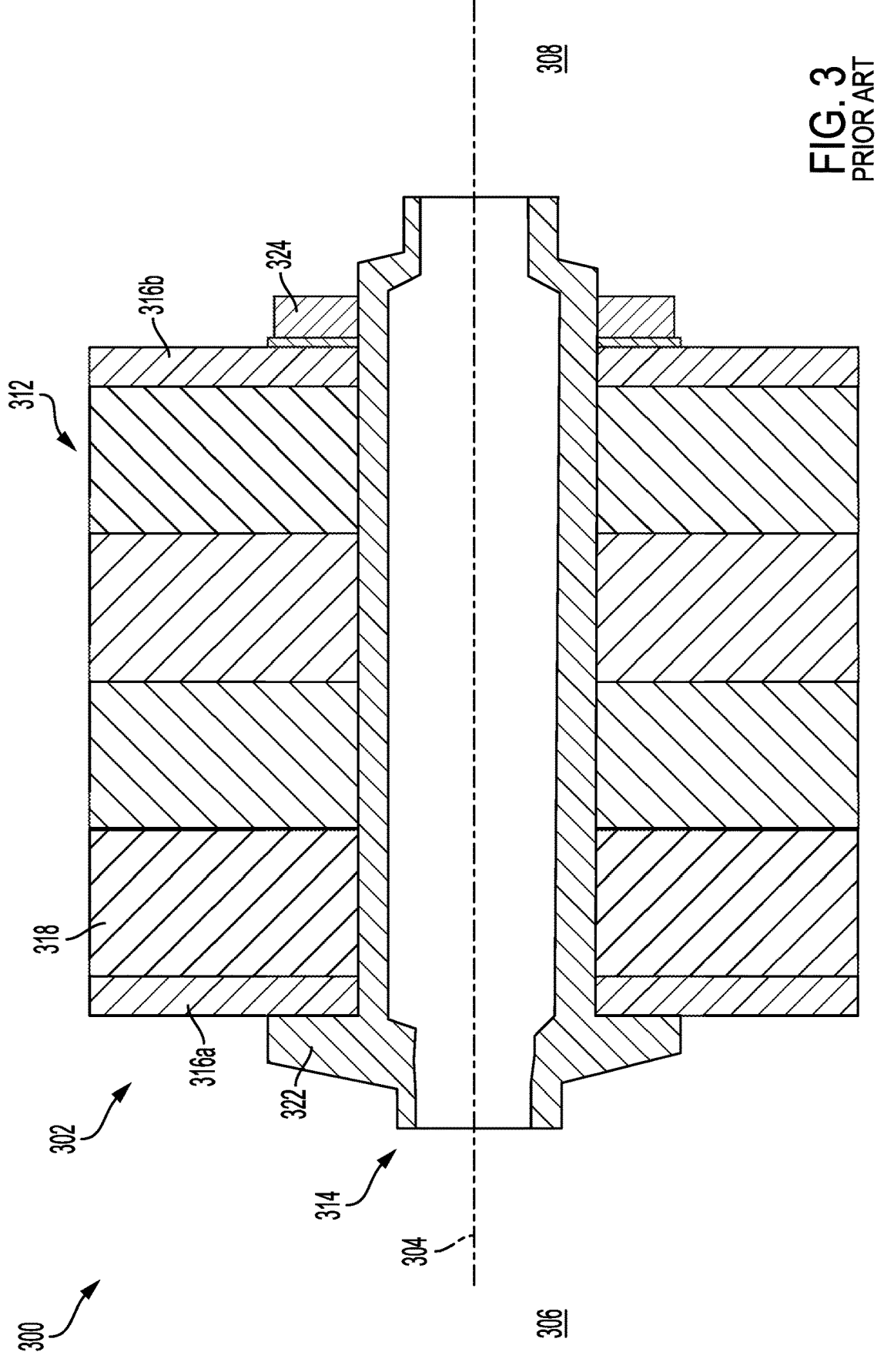
FIG. 3 shows a cross-sectional view of an example rotor core assembly according to the prior art.

Turning now to FIG. 3, FIG. 3 shows a schematic 300 of a rotor assembly 302 according to the prior art that comprises a shaft 314 extending therethrough.

As may be seen in the prior art example rotor assembly 302, the rotor assembly 302 may be centered on an axis 304, where the axis 304 is a central axis and longitudinal axis for the rotor assembly 302. The axis 304 may also be the axis of rotation for the rotor assembly 302. The rotor assembly 302 may have a first end positioned nearest to a first side 306 and a second end positioned nearest to a second side 308. The first side 306 and second side 308 may be opposite to one another.

The rotor assembly 302 may comprise a rotor core 312 that extends in an axial direction between a first end cap 316a and a second end cap 316b of the rotor assembly 302. As shown in FIG. 3, the first end cap 316a and the second end cap 316b are in the form of flat plates. In order to align the rotor assembly 302, a shaft 314 extends through the first end cap 316a, the center of the rotor core 312, and through the second end cap 316b. The shaft 314 further comprises a shoulder 322 at a first end of the shaft 314, where the shoulder 322 abuts an exterior surface of the first end cap 316a.

To hold the rotor assembly 302 together, the rotor assembly 302 further comprises a fastener 324 such as a lock nut at the second end of the shaft 314, that may be coupled to the shaft 314 and press against the second end cap 316b.

In this way, the shaft 314 running through the center of the first end cap 316a, the lamination stacks 318, and the second end cap 316b, with the shoulder 322 held against the first end cap 316a, in combination with the fastener 324 (e.g., a lock nut) tightened against the second end cap 316b, aligns and holds the example prior art rotor assembly 302 together.

In one or more examples, working fluid, such as oil, maybe housed in and passed through the rotor core 312 as lubricant and/or coolant for the rotor core 312 and the shaft 314.

As may be seen in FIG. 3, it is noted that the shoulder 322 of the shaft 314 may extend radially, with respect to the axis 304, from the shaft 314. The fastener 324 may also extend radially, with respect to the axis 304, about the shaft 314. The fastener 324 may be in surface sharing contact with the shaft 314. As previously mentioned, the fastener 324 may be of a lock nut configuration and may be fastened to complementary threading formed on the outer surface of shaft 314. The compressive force provided by the shoulder 322 and the fastener 324 fasten the lamination stacks 318 together to form the rotor core 312. Thus, the fastener 324 is in surface sharing contact with and abuts the second end cap 316b, and the shoulder 322 is in surface sharing contact with and abuts the first end cap 316a. In one or more examples, working fluid, such as oil, may be housed in and passed through the rotor core 312 as lubricant and/or coolant for the rotor core 312 and the shaft 314

Turning now to FIG. 4, FIG. 4 shows a schematic 400 of a first example of rotor assembly 402 according to the present disclosure, where the rotor assembly 402 is a shaftless rotor assembly without a shaft extending therethrough. Thus, the rotor assembly 402 according to the present disclosure may also be referred to herein as a shaftless rotor assembly.

The rotor assembly 402 may comprise cavity 406 that is centered about the axis 304. Additionally, a length of the rotor assembly 402 may extend axially, parallel to the axis 304, between the first side 306 and second side 308. As noted above, the rotor assembly 402 is a shaftless rotor assembly and thus lacks a shaft extending through the rotor core 408. The components of rotor core 408, including lamination stacks 418, radially surround and define the cavity 406 of the rotor assembly 402. Axis 304 may act be a central axis and longitudinal axis for the rotor assembly 402. The axis 304 may also be the axis of rotation for the rotor assembly 402.

The rotor core 408 forms a section of the rotor assembly 402 between a first end cap 416a and a second end cap 416b. The first end cap 416a may be located at an opposite end of the rotor core 408 from the second end cap 416b. For example, the first end cap 416a may be located nearest to the first side 306, and the second end cap 416b may be located nearest to the second side 308. The rotor core 408 may comprise a plurality of lamination stacks 418. In the rotor assembly 402, the lamination stacks 418 circumferentially surround and define a segment 420 of the cavity 406.

The lamination stacks 418 and the rotor core 408 may have electromagnetic properties, in one or more examples. For example, the lamination stacks 418 and rotor core 408 may incorporate windings, such that the lamination stacks

418 and rotor core 408 may form and act as an electromagnet when a current is applied. In some examples, the lamination stacks 418 may incorporate a plurality of permanent magnets, such that the lamination stacks 418 and rotor core 408 may act as part of an internal permanent magnet (IPM) electric machine.

In at least one example, the lamination stacks 418 may comprise steel, such as silicon steel or cold rolled steel. Additionally, or alternatively, the lamination stacks 418 may be formed of a steel alloy, such as a nickel or cobalt alloy.

As further shown in the rotor assembly 402 at FIG. 4, the first end cap 416a and the second end cap 416b may be fastened to the rotor core 408 via a plurality of fasteners 432, such as bolts or screws. For example, there may be at least two fasteners 432 fastening the first end cap 416a and the second end cap 416b to the rotor core 408. The fasteners 432 may be located radially with respect to the axis 304, about the cavity 406, and the fasteners 432 may extend through the material of the lamination stacks 418 in an axial direction parallel to the axis 304.

As may be seen in FIG. 4, a first end of the fasteners 432 may be anchored into the first end cap 416a. A length of the fasteners 432 spanning between the first end and the second end of the fasteners 432 extends through a plurality of first holes 434 formed into the lamination stacks 418 that are axially aligned. Further, the second end of the fasteners 432 extend through a plurality of second holes 436 formed into the second end cap 416b, and the first end of the fasteners 432 extend into a plurality of third holes 438 formed into the first end cap 416a. In this way, the fasteners 432 extend axially through the lamination stacks 418 of the rotor core 408 to pull the first end cap 416a and the second end cap 416b towards each other and hold the first end cap 416a, the lamination stacks 418, and the second end cap 416b of the rotor assembly 402 together.

In particular, the fasteners 432 may be fit to the plurality of first holes 434, where the plurality of first holes 434 are complementary to the fasteners 432 and extend axially through the rotor core 408. The fasteners 432 may further extend through the plurality of second holes 436 that may be complementary to the fasteners 432 and extend axially through the second end cap 416b. The fasteners 432 may additionally be fit to the plurality of third holes 438. The plurality of third holes 438 may be complementary to the fasteners 432 and the plurality of third holes 438 may extend axially, with respect to axis 304, through at least a portion of the first end cap 416a.

As shown at FIG. 4, it is noted that the plurality of third holes 438 may only extend through a portion of the first end cap 416a such that only an internally facing surface of the first end cap 416a that faces towards the lamination stacks 418 comprises openings associated with the plurality of third holes 438. In other examples, such as the example shown at FIG. 5, however, the plurality of third holes 438 may extend all the way through the first end cap 416a. In examples where the plurality of third holes 438 extend all the way through the first end cap 416a, both the surface of the first end cap 416a facing towards the lamination stacks 418 and an opposite, externally facing surface of the first end cap 416a comprise openings associated with the plurality of third holes 438.

The surfaces of the plurality of first holes 434 may have a threading complementary to a threading on the fasteners 432 such that the fasteners 432 may be threaded through the plurality of first holes 434. Likewise, the surfaces of the plurality of second holes 436 and the plurality of third holes 438 may each have a threading complementary to threading of the fasteners 432. In this way, portions of the fasteners 432 may be threaded through the plurality of second holes and the plurality of third holes 438.

The centerlines of the plurality of first holes 434, the plurality of second holes 436, and the plurality of third holes 438 may extend approximately parallel to and be positioned approximately radially about the axis 304. Likewise, when inserted and housed in the plurality of first holes 434, the plurality of second holes 436, and the plurality of third holes 438, the centerlines of the fasteners 432 may extend approximately parallel to and be positioned radially about the axis 304. In this way, the fasteners 432 may provide compression force axially, with respect to axis 304, to both the first end cap 416a and second end cap 416b. The axial compression of the first end cap 416a, second end cap 416b, and fasteners 432 may fasten the lamination stacks 418, and therein prevent the lamination stacks 418 from moving or separating in axially directions with respect to the axis 304.

The first end cap 416a may further comprise a first flange 442a and second end cap 416b may comprise a second flange 442b. As may be seen in FIG. 4, the first flange 442a and the second flange 442b are chamfered and extend axially inward towards the rotor core 408. That is, the first flange 442a and the second flange 442b may extend axially towards each other. The first flange 442a and the second flange 442b may further be centered about the axis 304 of the rotor assembly 402. As may further be seen in FIG. 4, the first flange 442a and the second flange 442b may be cylindrical in shape. In this way, the first flange 442a and the second flange 442b may form ring shaped extensions at interior facing sides of the first end cap 416a and the second end cap 416b, respectively.

Moreover, as may further be seen in FIG. 4, the first flange 442a and the second flange 442b may be in face sharing contact with walls of the lamination stacks 418 that face inward towards the axis 304. In at least one example, the first flange 442a and the second flange 442b may be in face sharing contact with a keyway cutout formed into such walls of the lamination stacks 418. Via face sharing contact of the first flange 442a and the second flange 442b with the inward facing walls of the lamination stacks 418, the first flange 442a and the second flange 442b may be configured to align the lamination stacks 418 of the shaftless rotor assembly 402.

Thus, in contrast to the flat plate-shaped end caps in the prior art approaches (e.g., first end cap 316a and the second end cap 316b as shown in the prior art example at FIG. 3) the first end cap 416a and the second end cap 416b according to the present disclosure may instead comprise ring-shaped extensions in the form of the first flange 442a and the second flange 442b, respectively. Moreover, no shaft extends through the rotor core 408 of the rotor assembly 402 of the present disclosure. Whereas prior art approaches (e.g., the prior art example at FIG. 3) utilize a shaft extending through the rotor assembly for alignment and coupling purposes, the rotor assembly 402 according to the present disclosure achieves alignment and coupling without the inclusion of a shaft extending therethrough. In addition to the first flange 442a and the second flange 442b, the first end cap 416a and the second end cap 416b may further define cylindrical openings. For example, the first end cap 416a may comprise a first cylindrical extension 444a defining a first cylindrical opening 448a, and the second end cap 416b may comprise a cylindrical section 444b defining a second cylindrical opening 448b.

In at least one example, the first flange 442a and the second flange portions 442b may be used to align the lamination stacks 418 by inserting the first flange 442a into a first end lamination stack 419 of the lamination stacks 418 and aligning the plurality of third holes 438 with the plurality of first holes 434 formed into the first end lamination stack 419.

Further lamination stacks 421a, 421b may then be aligned with the first end lamination stack 419 stack by aligning the plurality of first holes 434 of each of the further lamination stacks 421a, 421b with the plurality of first holes 434 of the first end lamination stack 419. Though two further lamination stacks 421a, 421b are shown in FIG. 4, it is noted that more or fewer further lamination stacks may be possible without departing from the scope of the present disclosure.

After aligning the further lamination stacks 421a, 421b, a second end lamination stack 423 of the plurality of lamination stacks 418 may further be aligned for coupling to the rotor assembly 402. In particular, the plurality of first holes 434 of the second end lamination stack 423 may be aligned with the plurality of first holes 434 of the further lamination stacks 421a, 421b. The second end lamination stack 423, as well as the remainder of the lamination stacks 418 and the first end cap 416a, may further be brought into alignment via insertion of the second flange 442b of the second end cap 416b into the second end lamination stack 423. In particular, the second flange 442b of the second end cap 416b may be inserted into a cavity 406 defined by the second end lamination stack 423, and the plurality of second holes 436 of the second end cap 416b may be aligned with the plurality of first holes 434 formed into the second end lamination stack 423. In this way, each of the lamination stacks 418 may be aligned with the first end cap 416a and the second end caps 416b.

Turning attention back to the first end cap 416a and the second end cap 416b, in addition to the first flange 442a and the second flange 442b, the first end cap 416a and the second end cap 416b may further define cylindrical openings. For example, the first end cap 416a may comprise a first cylindrical extension 444a defining a first cylindrical opening 448a, and the second end cap 416b may comprise a second cylindrical section 444b defining a second cylindrical opening 448b. The first cylindrical opening 448a and the second cylindrical opening 448b may further flare outward, away from the axis 304. For example, first end cap 416a interior walls may flare outward in a direction moving from the first cylindrical extension 444a towards the first flange 442a. Similarly, second end cap 416b interior walls may flare outward in a direction moving from the second cylindrical section 444b towards the second flange 442b. In this way, the first cylindrical opening 448a and the second cylindrical opening 448b open into a first larger opening 446a and a second larger opening 446b, defined by the first flange 442a and the second flange 442b, respectively.

Turning now to the fasteners 432, each of the fasteners 432 may be formed of a received end 452, a body 454, and a head 456. Each of the received ends 452 may be inserted into and engagingly coupled to one of the plurality of third holes 438. For example, the received ends 452 may be engagingly coupled via threading to the plurality of third holes 438. The received ends 452 may be tips of the fasteners 432 that are of a smaller diameter than the bodies 454 of the fasteners 432, in at least one example.

Concerning the body 454 of the fasteners 432, the body 454 may extend through the plurality of first holes 434. The body 454 of the fasteners 432 may further be engagingly coupled to the plurality of first holes 434. For example, the body 454 of the fasteners 432 may be engagingly coupled via threading to the plurality of first holes 434.

As to the plurality of second holes 436 that are formed into the second end cap 416b, the plurality of second holes 436 may comprise a diameter that is less than a diameter of the head 456 of the fasteners 432. In this way, a surface 466 into which the plurality of second holes 436 are formed provides a shoulder against which the head 456 of the fasteners 432 may abut. In at least one example, though the diameter of the plurality of second holes 436 may be smaller than the diameter of the heads 456, the plurality of second holes 436 may comprise a larger diameter than the plurality of first holes 434 and the plurality of third holes 438. In other examples, however, the plurality of second holes 436 may comprise a diameter approximately the same as the plurality of first holes 434.

Thus, via the configuration shown at FIG. 4, the first end cap 416a, second end cap 416b, and rotor core 408 may be aligned, such that the axis 304 is concentric to the aforementioned components and the centerlines of the plurality of first holes 434, the plurality of second holes 436, and the plurality of third holes 438 may be axially aligned. The fasteners 432 further extend through each of the plurality of first holes 434, the plurality of second holes 436, and the plurality of third holes 438 for alignment and coupling of the rotor assembly 402 without the inclusion of a shaft extending therethrough.

Turning now to FIG. 5, FIG. 5 shows a cross-sectional view 500 of a rotor assembly 502 according to the present disclosure. As with the rotor assembly 402, the rotor assembly 502 shown at FIG. 5 is a shaftless rotor assembly without a shaft extending therethrough. The rotor assembly 502 is shown centered about the axis 304 and formed of the same or similar components and features as rotor assembly 402. The components in FIG. 5 are shown approximately to scale.

The rotor assembly 502 shows additional features and components not shown in the schematic of the rotor assembly 402 shown in FIG. 4. For example, as may be seen at the rotor assembly 502 in FIG. 5, a fourth hole 520 and a fifth hole 522 may be located about portions of the fasteners 432. There may be a plurality of fourth holes 520 and fifth holes 522, with the fourth holes 520 being formed from the second end cap 416b and the fifth holes 522 being formed from the first end cap 416a. The fourth holes 520 and fifth holes 522 may be located radially about the axis 304. Each of the fourth holes 520 may share a center line with one of the second holes 436. Each of the fifth holes 522 may share a center line with one of the third holes 438. For one example, the fourth holes 520 and fifth holes 522 may be of approximately the same dimensions.

The rotor assembly 502 may have a plurality of retainers 532, such as nuts, to fasten and lock the fasteners 432 in place. Each of the retainers 532 may be fastened to portion of the fasteners 432. The retainers 532 may be fastened and threaded about the received ends 452. The each of the retainers 532 may abut a surface of an end cap, providing compressive force normal to the surface. Likewise, the each of heads 456 may abut surfaces, such as surface 466, of an end cap opposite the end cap abutted by the retainer 532. Each of the heads 456 may provide a compressive force normal to the aforementioned surfaces. Compressive force supplied by the retainers 532 and compressive force supplied by the heads 456 may be approximately parallel and in opposite directions to one another. For example, the heads 456 may abut the second end cap 416b and features of the fourth hole 520. For this example, the retainers 532 may abut the first end cap 416a and features of the fifth hole 522. The retainers 532 may prevent the fasteners 432 from unthreading and/or sliding axially toward the second side 308. The heads 456 may prevent the fasteners 432 from unthreading and/or sliding axially toward the first side 306.

In this way, the plurality of fasteners 432 are configured to be tightened onto the first end cap 416a and the second end cap 416b via the retainers 532 to apply a compressive force that fastens the first end cap 416a, the plurality of lamination stacks 418, and the second end cap together 416b. An amount of the compressive force is further adjustable via the retainers 532.

As an example, the each of the retainers 532 may abut a surface of the fifth hole 522. The surface may extend radially from the one of the plurality of third holes 438, with respect to the centerline of the third hole 438, and form into the fifth hole 522. The surface may be approximately flat. For one example of one embodiment, the surface may be of the approximately the same dimensions as surface 466.

For the rotor assembly 502, the cavity 406 may be of a first diameter 550. Cavity 406 may be of an approximately cylindrical shape. The first cylindrical opening 448a and the second cylindrical opening 448b may be approximately circular in cross-section and be of a fourth diameter 554a and a fifth diameter 554b, respectively. Additionally, the openings defined by the flanges may comprise diameters that are greater than the fourth diameter 554a and the fifth diameter 554b. For example, the opening 446a and the opening 446b may comprise a second diameter 552a and a third diameter 552b, respectively, where the second diameter 552a and the third diameter 552b are greater than the fourth diameter 554a and the fifth diameter 554b. The first flange portion 442a may also have a sixth diameter 556a that is variable, wherein the sixth diameter 556a may increase in distance at positions axially closer to the second diameter 552a and decrease in distance axially closer to the fourth diameter 554a, with respect to the axis 304. The second flange portion 442b may also have a seventh diameter 556b that is variable, wherein the seventh diameter 556b increase in distance at positions axially closer to the third diameter 552b and decrease in distance at positions axially closer to the fifth diameter 554b, with respect to the axis 304. The variability of the sixth diameter 556a and seventh diameter 556b may give the first flange portion 442a and the second flange portion 442b, respectively, a conical or semi-conical shape. The second diameter 552a may be of approximately the same distance as the third diameter 552b. The fourth diameter 554a may be of approximately the same distance as the fifth diameter 554b. The sixth diameter 556a may be of approximately the same distances as the seventh diameter 556b.

The each of the fourth holes 520 and fifth holes 522 may be of an eighth diameter and ninth diameter, respectively. Each of the plurality of second holes 436 and each of the plurality of third holes 438 may be of a tenth diameter 572 and eleventh diameter 574. Each of the first holes 434 may be of a twelfth diameter. The eighth diameter and ninth diameter may be of a greater distance than the tenth diameter 572, eleventh diameter 574, and twelfth diameter. For an example of one embodiment, the tenth diameter 572 and eleventh diameter 574 may be of a greater distance than the twelfth diameter. For an example of another embodiment, the tenth and eleventh diameters 572, 574 may be of a distance approximately the same as the twelfth diameter.

Each of the fourth holes 520 has a first inner surface 568. Each of the fifth holes 522 has a second inner surface 570. Each of the first inner surfaces 568 and second inner surfaces 570 may be located about their respective holes, the fourth holes 520 and fifth holes 522, respectively. The first inner surface 568 may be located radially about the centerline of the fourth hole 520. The second inner surface 570 may be located radially about the centerline of the fifth hole 522.

In this way, a rotor assembly may be assembled such as to not include a shaft surrounded by and drivingly coupled to a rotor core. Additionally, the components of the rotor assembly may be assembled and fastened without a lock nut style fastening system and/or an extension, such as a shoulder, from a shaft. A rotor core of the rotor assembly may form a cavity that may be used to house and transfer work fluid, such as oil, that may be used as a lubricant or coolant for the rotor assembly and other components of a vehicle. The rotor core may be fastened between at least two end caps, such as a first end cap and a second end cap, by the compressive force of a plurality of fasteners. The fasteners may be arranged through the components rotor assembly such that their centerlines are approximately parallel with and are positioned radially about an axis the rotor assembly may be centered on. Each of the fasteners may extend through a plurality of holes formed in the rotor core, the first end cap, and the second end cap. The fastener may be threaded, wherein the threading may be complementary to a threading formed from or joined to the aforementioned holes. The compressive force of the interlocking threading may help fasten the layers of the core together. The fasteners may have a head and a received end. The received end may be fastened, such as via a complementary threading, to a retainer, such as a bolt. The retainer and head of each of the fasteners may apply compressive force end caps on opposite sides of the rotor core.

The disclosure also provides support for a shaftless rotor assembly, comprising: a first end cap, a second end cap, a plurality of lamination stacks positioned between the first end cap and the second end cap that define a hollow rotor core, and a plurality of fasteners extending in an axial direction through the first end cap, through the plurality of lamination stacks, and through at least a portion of the second end cap. In a first example of the system, each of the plurality of fasteners are configured to be tightened onto the first end cap and the second end cap to apply a compressive force that fastens the first end cap, the plurality of lamination stacks, and the second end cap together. In a second example of the system, optionally including the first example, each of the plurality of fasteners extend in a direction parallel to an axis of rotation for the shaftless rotor assembly. In a third example of the system, optionally including one or both of the first and second examples, the first end cap comprises a first flange, and wherein the first flange is in face sharing contact with an interior surface of a first end lamination stack of the plurality of lamination stacks. In a fourth example of the system, optionally including one or more or each of the first through third examples, the first end cap comprises a first flange, and wherein the first flange is fit into a first keyway, the first keyway formed into a first end lamination stack of the plurality of lamination stacks. In a fifth example of the system, optionally including one or more or each of the first through fourth examples, a first flange of the first end cap and a second flange of the second end cap extend towards each other, and wherein the first flange and the second flange both comprise chamfered edges.

The disclosure also provides support for a shaftless rotor assembly comprising: a pair of end caps, where each end cap has a chamfered cylindrical flange extending axially inwards towards a rotor core of the shaftless rotor assembly, a plurality of lamination stacks having at least one keyway cutout for alignment with the pair of end caps, and a plurality of fasteners threaded through the pair of end caps and the plurality of lamination stacks parallel to an axis of rotation. In a first example of the system, the plurality of fasteners are inserted and threaded into a plurality of first holes formed through the plurality of lamination stacks, a plurality of second holes formed in a first end cap, and a plurality of third holes formed in a second end cap. In a second example of the system, optionally including the first example, the plurality of first holes, the plurality of second holes, and the plurality of third holes are positioned radially about the axis of rotation. In a third example of the system, optionally including one or both of the first and second examples, centerlines of the plurality of first holes, the plurality of second holes, and the plurality of third holes are aligned, and wherein the centerlines are collinear. In a fourth example of the system, optionally including one or more or each of the first through third examples, the plurality of fasteners are coupled to the plurality of first holes via threading. In a fifth example of the system, optionally including one or more or each of the first through fourth examples, one end of each of the plurality of fasteners extends through a second end cap of the pair of end caps, and wherein a retainer is fastened to the one end of each of the plurality of fasteners. In a sixth example of the system, optionally including one or more or each of the first through fifth examples, the retainer and a head of each of the plurality of fasteners provide compressive forces in opposite directions parallel with the axis, wherein the retainer and the head abut and press against the pair of end caps.

The disclosure also provides support for a shaftless rotor assembly, comprising: a first end cap, a second end cap, a rotor core comprising a plurality of lamination stacks that are axially positioned between the first end cap and the second end cap, wherein a shaft does not extend through the rotor core, and a plurality of fasteners, wherein each of the plurality of fasteners extend through the first end cap, a material the plurality of lamination stacks, and the second end cap, and wherein the plurality of fasteners are positioned circumferentially around and radially spaced away from an axis of rotation of the shaftless rotor assembly. In a first example of the system, the first end cap comprises a first flange, and wherein the second end cap comprises a second flange, the first flange and the second flange positioned within a first end lamination stack and a second end lamination stack of the plurality of lamination stacks, respectively. In a second example of the system, optionally including the first example, the first end cap comprises a first flange that is in face sharing contact with an internally facing surface of a first end lamination stack of the plurality of lamination stacks. In a third example of the system, optionally including one or both of the first and second examples, the plurality of fasteners are only coupled to the first end cap, the plurality of lamination stacks, and the second end cap. In a fourth example of the system, optionally including one or more or each of the first through third examples, the system further comprises: a retainer coupled one end of each of the plurality of fasteners, wherein the plurality of fasteners are configured to apply compressive force to the first end cap, the plurality of lamination stacks, and the second end cap, wherein the compressive force holds the first end cap, the plurality of lamination stacks, and the second end cap together, and wherein an amount of the compressive force is adjustable via the retainer. In a fifth example of the system, optionally including one or more or each of the first through fourth examples, the first end cap comprises a first flange, and wherein the first flange is fit into a first keyway, the first keyway formed into a first end lamination stack of the plurality of lamination stacks, and wherein the second end cap comprises a second flange, and wherein the second flange is fit into a second keyway, the second keyway formed into a second end lamination stack of the plurality of lamination stacks, the first end lamination stack and the second end lamination stack at opposite ends of the rotor core. In a sixth example of the system, optionally including one or more or each of the first through fifth examples, the first end cap, each of the plurality of lamination stacks, and the second end cap comprise holes that are axially aligned through which the plurality of fasteners extend.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A shaftless rotor assembly, comprising:
a first end cap;
a second end cap;
a plurality of lamination stacks positioned between the first end cap and the second end cap that define a hollow rotor core; and
a plurality of fasteners extending in an axial direction through the first end cap, through the plurality of lamination stacks, and through at least a portion of the second end cap, and wherein the plurality of fasteners is engagingly coupled via threading directly to a plurality of holes within the first end cap.

2. The shaftless rotor assembly of claim 1, wherein each of the plurality of fasteners is configured to be tightened onto the first end cap and the second end cap to apply a compressive force that fastens the first end cap, the plurality of lamination stacks, and the second end cap together.

3. The shaftless rotor assembly of claim 1, wherein each of the plurality of fasteners extends in a direction parallel to an axis of rotation for the shaftless rotor assembly.

4. The shaftless rotor assembly of claim 1, wherein the first end cap comprises a first flange, and wherein the first flange is in face sharing contact with an interior surface of a first end lamination stack of the plurality of lamination stacks.

5. The shaftless rotor assembly of claim 1, wherein the first end cap comprises a first flange, and wherein the first flange is fit into a first keyway, the first keyway formed into a first end lamination stack of the plurality of lamination stacks.

6. The shaftless rotor assembly of claim 1, wherein a first flange of the first end cap and a second flange of the second end cap extend towards each other, and wherein the first flange and the second flange both comprise chamfered edges.

7. A shaftless rotor assembly comprising:
a pair of end caps, where each end cap has a chamfered cylindrical flange extending axially inwards towards a rotor core of the shaftless rotor assembly;
a plurality of lamination stacks having at least one keyway cutout for alignment with the pair of end caps; and
a plurality of fasteners threaded through the pair of end caps and the plurality of lamination stacks parallel to an axis of rotation, and wherein the plurality of fasteners is inserted and threaded into a plurality of first holes formed through the plurality of lamination stacks directly within one of the pair of endcaps, a plurality of second holes formed in a first end cap, and a plurality of third holes formed in a second end cap, and wherein the plurality of fasteners is directly coupled to the plurality of first holes via threading.

8. The shaftless rotor assembly of claim 7, wherein the plurality of first holes, the plurality of second holes, and the plurality of third holes are positioned radially about the axis of rotation.

9. The shaftless rotor assembly of claim 7, wherein centerlines of the plurality of first holes, the plurality of second holes, and the plurality of third holes are aligned, and wherein the centerlines are collinear.

10. The shaftless rotor assembly of claim 7, wherein the pair of end caps comprise a cylindrical extension that extends in an axial direction away from the rotor core.

11. The shaftless rotor assembly of claim 7, wherein one end of each of the plurality of fasteners extends through the second end cap of the pair of end caps, and wherein a retainer is fastened to the one end of each of the plurality of fasteners.

12. The shaftless rotor assembly of claim 11, wherein the retainer and a head of each of the plurality of fasteners provide compressive forces in opposite directions parallel with the axis, wherein the retainer and the head abut and press against the pair of end caps.

13. A vehicle, comprising:
a shaftless rotor assembly, comprising:
  a first end cap;
  a second end cap;
  a rotor core comprising a plurality of lamination stacks that is axially positioned between the first end cap and the second end cap, wherein a shaft does not extend through the rotor core, wherein the first end cap comprises a first flange that is in face sharing contact with an internally facing surface of a first end lamination stack of the plurality of lamination stacks; and
  a plurality of fasteners, wherein each of the plurality of fasteners extends through the first end cap, a material the plurality of lamination stacks, and the second end cap, and wherein the plurality of fasteners is positioned circumferentially around and radially spaced away from an axis of rotation of the shaftless rotor assembly, and wherein the plurality of fasteners is engagingly coupled via threading to a plurality of holes of the first end cap, wherein a central axis of rotation for the shaftless rotor assembly is aligned longitudinally in the vehicle;
a transmission coupled to the shaftless rotor assembly, the transmission and the shaftless rotor assembly positioned in a front end of the vehicle;
auxiliary devices; and
a controller configured to operate the vehicle in power take-off, wherein the shaftless rotor assembly is used to deliver electrical energy to external, auxiliary devices during power take-off via the shaftless rotor assembly running during power take-off with drive wheels of the vehicle not in motion, allowing power output to be directed at least partially towards operating the auxiliary devices, the vehicle further including a power interface arranged along an electrical circuit of the vehicle, the power interface having a plurality of power outlets positioned in a rear of the vehicle, wherein each of the power outlets have a circuit breaker integrated therein.

14. The vehicle of claim 13, wherein the first end cap comprises a first flange, and wherein the second end cap comprises a second flange, the first flange and the second flange positioned within a first end lamination stack and a second end lamination stack of the plurality of lamination stacks, respectively, and wherein the first end cap and the second end cap are chamfered at a radially outer edge.

15. The vehicle of claim 13, wherein the plurality of fasteners is only coupled to the first end cap, the plurality of lamination stacks, and the second end cap.

16. The vehicle of claim 13, further comprising a retainer coupled one end of each of the plurality of fasteners,
  wherein the plurality of fasteners is configured to apply compressive force to the first end cap, the plurality of lamination stacks, and the second end cap,
  wherein the compressive force holds the first end cap, the plurality of lamination stacks, and the second end cap together, and
  wherein an amount of the compressive force is adjustable via the retainer.

17. The vehicle of claim 13, wherein the first flange is fit into a first keyway, the first keyway formed into the first end lamination stack of the plurality of lamination stacks, and wherein the second end cap comprises a second flange, and wherein the second flange is fit into a second keyway, the second keyway formed into a second end lamination stack of the plurality of lamination stacks, the first end lamination stack and the second end lamination stack at opposite ends of the rotor core.

18. The vehicle of claim 13, wherein the first end cap, each of the plurality of lamination stacks, and the second end cap comprise holes that are axially aligned through which the plurality of fasteners extends.

\* \* \* \* \*